Figure 1:
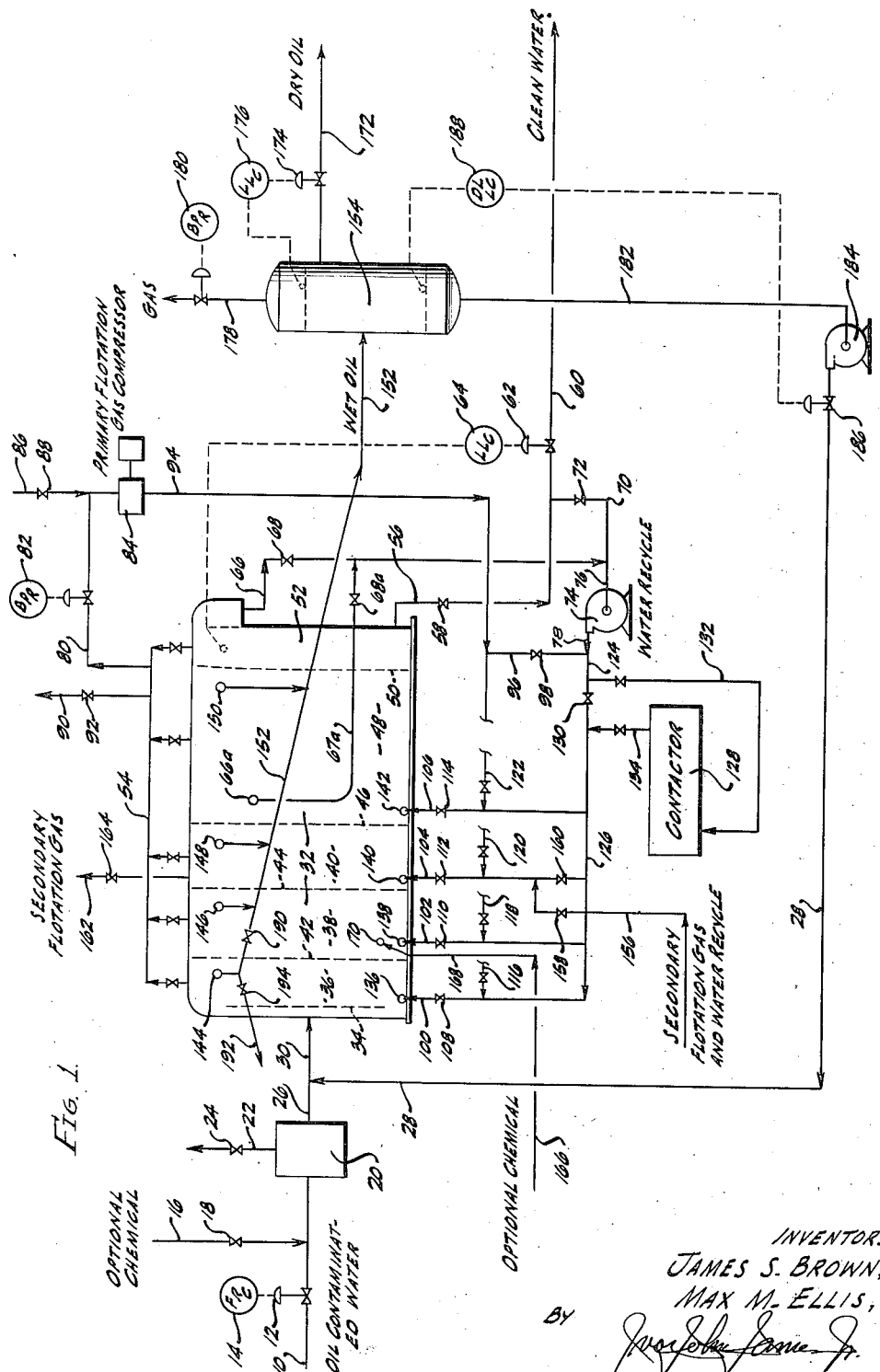

Oct. 9, 1956　　　J. S. BROWN ET AL　　　2,766,203
WATER PURIFICATION PROCESS AND APPARATUS
Filed Feb. 9, 1953　　　　　　　　　　　　　2 Sheets-Sheet 2

INVENTOR.
JAMES S. BROWN,
MAX M. ELLIS,
BY
AGENT.

United States Patent Office 2,766,203
Patented Oct. 9, 1956

2,766,203

WATER PURIFICATION PROCESS AND APPARATUS

James S. Brown, San Gabriel, and Max M. Ellis, Fullerton, Calif., assignors to Union Oil Company of California, Los Angeles, Calif., a corporation of California Application February 9, 1953, Serial No. 335,882

19 Claims. (Cl. 210—16)

This invention relates to the purification of contaminated water and in particular relates to the removal and recovery of oils of various types from oil-contaminated water.

Water contaminated with oil is encountered in many industrial operations. The brine produced along with crude petroleum contains residual quantities of crude oil and hydrocarbonaceous materials including solids. The oil and solids and any oxygen which contaminate the water must be removed before the water can be used in secondary recovery operations or discarded. Water and oil mixtures are formed during the water washing of refined petroleum fractions following such refining processes as caustic or acid washing or other chemical treatment. Oil-contaminated water is also accumulated in refining operations from the drainage from the various equipment employed in petroleum refining. Water and oil mixtures are also found in the separation and refining of coal tar fractions, the retorting of shale oil from oil shales, in the recovery of fish oils from whale, shark and fish carcasses, in vitamin recovery operations, and in the steam distillation of vegetable oils and fats. The recovery of essential oils from vegetable matter and many other miscellaneous operations result in the production of water phases containing various quantities of oil contamination.

Customarily, recovery of oil from water is effected by settling, stratification, and decantation operations in which the separated oil and water phases are retreated, stored or discarded depending on circumstances. In large scale operations, open skim ponds are employed from which volatile oils may be lost to the atmosphere. Very often, particularly when the oil content of the fluid to be treated is low or dispersions or emulsions of the oil occur in the water phase, the conventional treatment does not effectively separate all the oil from the water. Even following stratification operations, the water phase may contain as much as 500 parts per million of oil and yet have a clear appearance.

Three of the principal situations in which the purification of such water is desirable are those in which: (1) the water is to be employed in a subsequent process and the oil contamination cannot be tolerated, (2) the contaminating oil is sufficiently valuable that recovery thereof is desirable, and (3) local regulations establish a maximum oil contamination for waste water to be discharged through sewers, streams, etc.

Examples of the first situation are the secondary recovery operations for crude petroleum in which water is injected through an injection well into a permeable oil-containing formation to displace residual quantities of petroleum. Emulsified oil or suspended or dispersed solids contained in the injection water detrimentally affect these recovery operations, one principal problem being the plugging of the porous formation at the water injection point.

An example of the second situation lies in the recovery of Vitamin A from shark and other fish liver oils wherein small quantities of these substances escaping in contaminated discarded water constitute a large economic loss.

The third situation is illustrated by the problem encountered in waste water disposal. Many times local regulations specify that before oil-contaminated waste water can be disposed of through streams, sewers, etc., the oil content must be below some stated maximum value, generally 10 to 25 p. p. m. (parts per million) of oil.

The present invention therefore is directed to an improved process and apparatus for the treatment of oil-contaminated water to effect a highly efficient removal and recovery of the oil phase, whether it is present in solution, as a dispersion or as an emulsion, to produce a substantially oil-free water.

It is a primary object of this invention to provide an improved combination process for the separation of animal, vegetable or mineral oil and any associated solids from oil-contaminated streams of water.

It is an additional object of this invention to provide a gas flotation process for the recovery of petroleum hydrocarbons from water contaminated therewith to produce a substantially oil-free water having an oil content reduced to values well below about 10 p. p. m.

It is a specific object of this invention to provide a process for the purification of oil-contaminated water in which the water stream is passed horizontally in substantially straight flow lines through a plurality of communicating individual flotation zones in at least one of which the water stream is contacted at right angles with a stream of flotation gas bubbles.

It is an other specific object of this invention to apply the multizone flotation process to the purification of water contaminated with animal, vegetable or mineral oils including oil-contaminated oil well brine, oil refinery waste water, and the like.

It is another object of this invention to provide an improved apparatus adapted to accomplish the aforementioned objects.

Additional objects and advantages of the present invention will become apparent to those skilled in the art as the description thereof proceeds.

Briefly, the present invention comprises an improved process for the treatment of oil-contaminated streams of water in a multizone flotation system in which the water containing oil contamination, whether present in the water as an emulsion, dispersion or otherwise admixed therewith, is passed successively through the individual cells or zones of a multicell flotation zone. The water stream passes horizontally in substantially straight flow lines successively through a plurality of communicating individual flotation cells. The stream of water thus flowing is contacted in at least one and preferably a plurality of the individual zones with flotation gas bubbles which pass through the stream of water at substantially right angles. This treatment effectively agglomerates dispersed oil particles, breaks oil-water emulsions, and sweeps the oil from the water stream to the surface thereof. The flotation gas is injected near the bottom of each individual flotation zone in which gas is to be injected so that the bubbles pass upwardly therethrough. The water to be treated is passed laterally or horizontally at substantially right angles to the rising current of flotation gas bubbles.

The individual flotation zones are separated from one another by a foraminate or perforated baffle which is substantially vertical and is provided with preferably a plurality of parallel vertically elongated slots through which the water stream to be treated passes between adjacent flotation zones. These slots or openings also serve to maintain the water flowing in a horizontal and linear path.

It has been found that substantially improved product water purities can be obtained when the amount of internal recirculation and turbulence within the individual flotation zones are reduced to a minimum. By employing the vertical slotted baffles between adjacent flotation zones, the general flow of water through the entire system, that is, through the series of individual flotation zones, is maintained in a substantially straight line in the presence of a current of flotation gas bubbles rising at right angles through the stream of water. The tendency of the water to rise in the rising stream of flotation gas bubbles and then to fall adjacent the downstream end of the flotation zone and recirculate therein is substantially eliminated. The tendency therefore of these internal recirculation streams to carry agglomerated oil downwardly through any individual flotation zone and thereby impair the process efficiency is eliminated and it is believed that this accounts for the improved oil contents of waste water treated. It is found that in this manner of treatment, residual oil contamination is reduced to values of less than 10 p. p. m. and in most cases values of between 2 and 6 p. p. m. are realized.

Any number of individual flotation zones may be employed such as from 2 to 25 or more depending upon the degree to which the oil contamination is to be reduced, the "tightness" of emulsions which may be present, and other considerations. Generally, it is felt that from 3 to 7 individual flotation zones, operated under conditions subsequently described, are adequate to purify most oil-contaminated waters to less than about 10 p. p. m. of oil.

The water flowing from the last gas agitated flotation zone in the series is preferably discharged in the same horizontal flow direction into a degassing zone through which the water passes horizontally in the absence of additional flotation gas. In this zone residual quantities of the finer flotation bubbles are allowed to rise and be disengaged from the water stream to produce an oil-free water stream which is also substantially free of entrained flotation gas. When such a degassing zone is employed, it is preferable to remove the clean water product from a point adjacent the bottom downstream end of the degassing zone since at this point entrained flotation gas content approaches zero.

The injection of flotation gas at the bottom of the individual flotation zones is preferably accomplished by withdrawing a portion of the clean water product, contacting this portion of clean water with a flotation gas under a superatmospheric pressure for a sufficient time and with sufficient water-gas interfacial area exposed so as to dissolve a portion of the gas in the clean water, and subsequently injecting a stream of gas-saturated water adjacent the bottom of each individual flotation zone. Each of these streams of gas-saturated water recycle is passed through a restriction zone such as an orifice, a throttling valve, a Venturi or similar flow restriction whereby the water pressure is reduced which causes the dissolution of at least part and usually substantially all of the dissolved flotation gas to liberate a stream of microscopic flotation gas bubbles. These microscopic bubbles are considerably smaller in size than those formed from the undissolved flotation gas and have been found to be especially effective in breaking oil-water emulsions and agglomerating dispersed oil particles whereby the large or macroscopic flotation gas bubbles actively sweep the agglomerated oil particles to the surface. The foregoing is the preferred form of flotation gas introduction and flotation gas bubble generation. In some cases in which the water to be purified is relatively easily separable, the conventional methods of flotation gas injection such as the porous sock, porous plate methods may be employed.

In the flotation steps of the process of this invention, the flotation gas bubbles fall into two clasifications according to size when produced according to the preferred method indicated. By injecting flotation gas into the water recycle stream, part of the gas is dissolved. Subsequent depressuring of the thus gas-treated water recycle through a distributing and dispersion device causes liberation of most of the dissolved flotation gas in the form of extremely minute microscopic gas bubbles. These bubbles are believed to be about the same size as the emulsified oil particles and effectively agglomerate them. The undissolved part of the flotation gas is dispersed into larger bubbles by the dispersion device and these larger bubbles effectively sweep the small gas bubble-oil particle agglomerates upwardly through the water phase into the supernatant oil phase. The microsocpic bubbles are apparently of the order of from $10^{-4}$ to $10^{-2}$ mm. in diameter while the diameter of the larger dispersed bubbles are of the order of 0.5 to 5 mm. Bubbles of these sizes are believed to be the ones effective to secure the results. Only through the partial dissolution of flotation gas in a recycle water stream and subsequent depressuring and dispersion can this size range of bubbles and the efficient results be obtained.

When the preferred recycle water system for flotation gas bubble generation is employed, it is preferred that the portion employed for recirculation be withdrawn from the upper downstream end of the degassing zone since this portion may contain residual dispersed flotation gas bubbles. In another modification, the recycle water is withdrawn from the upper upstream portion of the degassing zone whereby in addition the water velocity therein is proportionally decreased to allow longer degassing time. This water, in either case, is recirculated with additional flotation gas and injected into the flotation zones as described.

The process of this invention includes one modification in which the raw oil-contaminated feed water is passed first through a primary oil-water separator zone whereby agglomerated oil may be withdrawn leaving an oil-contaminated water stream of reduced oil content. This reduces the load on the initial flotation zone and minimizes the quantity of oil separated in the multicell flotation system. Only that portion of oil which rises rapidly to the surface is separated in the primary separation zone.

The separated oil removed from the surface of the various flotation zones in the multizone flotation system is relatively wet and contains as high as 60% water. This wet oil stream is preferably passed through a secondary oil-water separation zone in which the oil and water are separated by stratification. The supernatant oil layer is withdrawn from the top and a stream of oil-contaminated water is withdrawn from the bottom. The latter stream may be recirculated through the multizone flotation system to produce substantially oil-free water.

It is within the contemplation of the present invention to employ water treating chemicals in connection with the flotation treatment described. In one operation, the formation of insoluble metal sulfides in the water is prevented by the stripping of hydrogen sulfide therefrom during treatment by the flotation gas simultaneously with the injection of a bactericide to prevent sulfate-reducing bacteria from forming additional sulfide in the water. Bactericides such as the quaternary ammonium salts, paraformaldehyde, chlorine, and other well-known reagents may be used. In the present invention any insoluble metal sulfides are floated off with the oil and are thus removed from the water.

The water may be treated with a flotation gas such as carbon dioxide in one of the flotation zones to stabilize it with respect to calcium carbonate. This is preferably done in the last flotation zone in the series. Such a treatment effectively displaces the calcium carbonate equilibrium toward the bicarbonate and prevents any calcium carbonate precipitation.

It is within the contemplation of this invention to employ different flotation gases in different flotation zones. For example, air or natural gas may be employed as a primary flotation gas to treat an oil field brine in the first several flotation zones and then carbon dioxide may be employed as a secondary flotation gas in the last flotation zone to stabilize the treated water with respect to calcium carbonate. Other applications of two or more flotation gases in the treatment of contaminated water will occure to those skilled in the art from the foregoing description.

The conventional flocculation procedures may be carried out in the process of the present invention by injecting floc-forming chemicals such as aluminum sulfate and sodium silicate into the water passing through one or more of the flotation zones. The resulting floc may be allowed to settle in the degassing zone or it may be withdrawn and separately settled in another vessel. Such a flocculation step serves to remove suspended solids which have not been removed by the prior flotation procedures.

The addition of the conventional flotation aids for the flotation separation of specific solids may be employed in the multicell flotation system of this invention if found to be necessary to treat a particular contaminated water.

Figure 2:
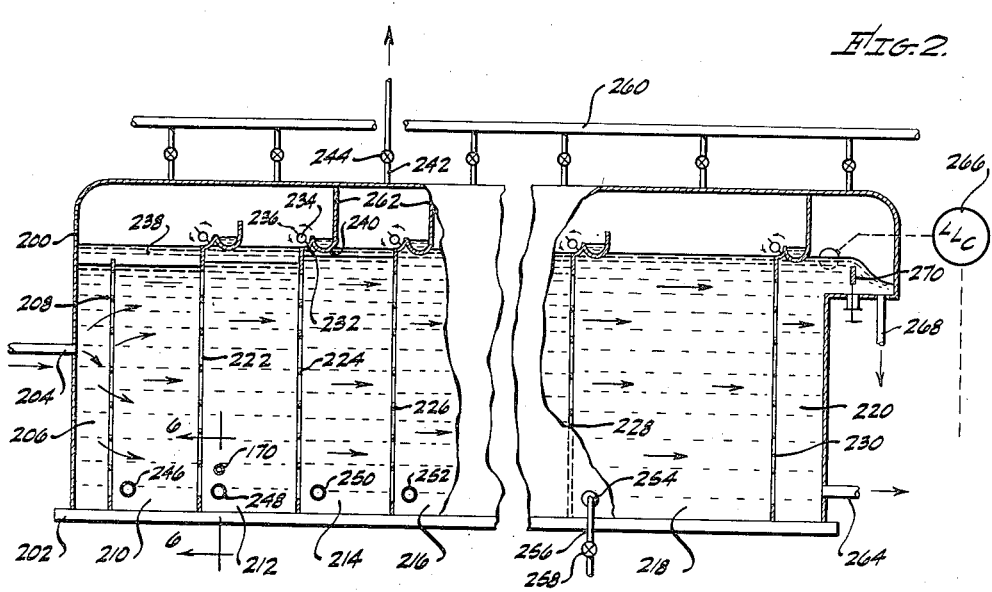
Figure 5:
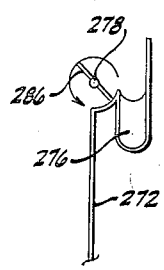
Figure 4:
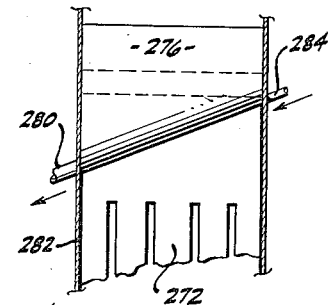
Figure 3:
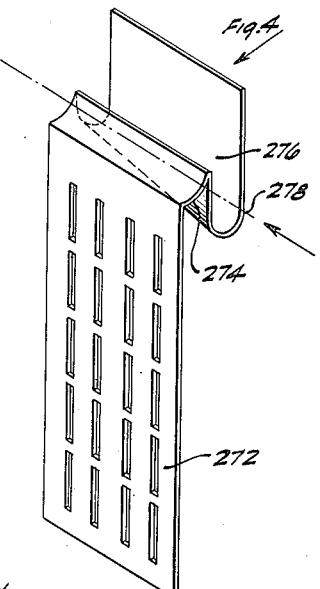
Figure 6:
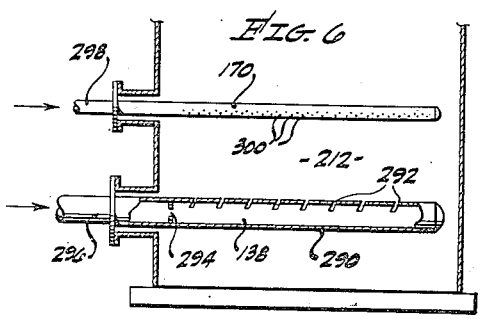

The equipment employed in practicing the present invention and the process flow involved therein will be more clearly understood by reference to the accompanying drawings in which:

Figure 1 is a schematic flow sheet of the process of this invention showing the primary and secondary oil-water separation zone and the improved multizone flotation system of this invention, Figure 2 is a vertical side elevation in partial cross section of the multicell flotation apparatus of this invention, Figure 3 is an isometric view of the slotted baffles employed in the apparatus of Figure 2, Figures 4 and 5 are elevation views of the baffle shown in Figure 3, and Figure 6 is a lateral elevation view in cross section of the lower portion of an individual flotation zone showing the water recycle depressuring and distribution apparatus and a water treating chemical distributing device.

Referring now more particularly to Figure 1, the description thereof will be conducted as an example of the application of the process of this invention to purification of oil-contaminated oil field brine.

*Example I*

The raw water containing 300 p. p. m. of non-agglomerated oil passes through line 10 at a rate of 2675 barrels per day controlled by valve 12 in accordance with flow recorder controller 14. Any of the conventional water treating chemicals may be added, if desired, through line 16 controlled by valve 18. The water then enters primary oil-water separation zone 20 from which supernatant oil and any gases are removed through line 22 controlled by valve 24. The partially purified water is passed through line 26, is combined with recirculated oil-contaminated water from the secondary oil-water separation zone flowing through line 28, and is then passed through line 30 into multicell flotation zone 32. The water is distributed throughout the vertical cross section of flotation zone 32 by means of foraminate distributing baffle 34 and then passes horizontally in substantially straight flow lines successively through individual flotation zones 36, 38, and 40. These flotation zones are separated from one another by slotted vertical baffles 42 and 44. The water passes from flotation zone 40 through vertical baffle 46 into water degassing zone 48 in which the residual dispersed flotation gas bubbles rise to the surface and are disengaged from the body of liquid. The oil-free and flotation gas-free water then passes through an optional vertical baffle 50 into an outlet zone 52. The flotation gas, collecting in the upper portions in each of zones 36, 38, 40, 48, and 52, is withdrawn therefrom by individual outlets opening into manifold 54. From the lower end of outlet zone 52 gas-free and oil-free water is withdrawn through line 56 provided with valve 58 and passes through product water line 60 at a rate of 2655 barrels per day controlled by valve 62 in accordance with liquid level controller 64.

Outlet line 66 opens from the upper portion of removal zone 52 and is provided with valve 68. These two outlet lines 56 and 66 may be used alone or in combination for water removal from the system. In one modification, the product water is withdrawn through line 56 while that employed for flotation gas injection is withdrawn through line 66. If desired, the reverse operation may be employed. In another modification, the entire water outlet stream may be withdrawn from line 66 and divided into two streams, the product stream passing through line 70 provided with block valve 72 and into line 60 while the recycle portion passes into pump 74 through line 76. In another modification, the entire water output is withdrawn from line 56 and divided into two streams, the product portion passing through line 60 and the recycle portion passing through lines 70 and 76 into water recycle pump 74. In a fourth and preferred modification, the recycle water is removed via outlet 66a adjacent the upper upstream part of degassing zone 48 and passed via line 67a controlled by valve 68a to recycle pump 74 whereby water containing residual flotation gas is recirculated and in addition a proportionate decrease in lineal water velocity in the degassing zone is effected whereby a proportionately increased flotation gas removal is effected.

In any of the foregoing modifications, the recycle water, flowing at a rate of 600 barrels per day (42 U. S. gallons per barrel) passes through line 78 and is combined with primary flotation gas under pressure. If desired, this gas may be removed from flotation gas manifold 54 and passed through line 80 controlled by back pressure regulator 82 into primary flotation gas compressor 84. Make-up flotation gas is introduced through line 86 at a rate controlled by valve 88. If desired, a fresh stream of primary flotation gas may be introduced through line 86 and the gas from manifold 54 separately vented through line 90 controlled by valve 92. In this example, the flotation zone 32 is operated at a pressure of 0.5 p. s. i. g. (pounds per square inch gauge). The flotation gas is natural gas and is pressured to 55 p. s. i. g. in compressor 84 at a rate of 1200 S. C. F./D. (S. C. F./D. is standard cubic feed per day). The compressed flotation gas flows through line 94 and may be wholly injected through line 96 controlled by valve 98 into the high pressure effluent from water recycle pump 74 or it may be individually injected into the separate water recycle streams flowing through lines 100, 102, 104, and 106 controlled by valves 108, 110, 112, and 114 through separate lines 116, 118, 120 and 122 respectively.

When the entire flotation gas is injected into the high pressure water recycle, the gas-saturated water flows through line 124 into water recycle manifold 126 and then respectively through lines 100, 102, 104, and 106 into the individual flotation zones. Line 106 controlled by valve 114 opens into degassing zone 48 which may be employed optionally as a flotation zone. In the preferable mode of operation, valve 114 is closed and no gas-saturated water recycle is injected.

The mixture of high pressure flotation gas and water recycle may be caused to flow through contactor 128 when block valve 130 is closed. The mixture thus passes through line 132 into contactor 128 and then through outlet line 134 into manifold 126. The contactor 128 may be a conventional contacting column adapted to either countercurrent or concurrent gas-liquid contact, a packed tank or other apparatus adapted to allow sufficient time for the gas to dissolve at least partially in the water recycle and to provide sufficient interfacial area to enhance the solution.

The gas-saturated water recycle is injected into the bottom and near the upstream end of the individual flotation zones (shown in Figure 1 as the lower left-hand corner of flotation zones 36, 38 and 40 respectively). The depressuring of the individual recycle gas streams through valves 108, 110, and 112 respectively or through separate orifices contained in the distributors 136, 138, 140, and 142, causes the partial dissolution of the dissolved portion of the flotation gas and thereby releases a current of highly effective microscopic flotation bubbles which rise at right angles to and through the current of oil-contaminated water passing horizontally through the individual flotation zones. The flotation gas collects and is removed from the upper portions of the flotation zones as described above. The oil, separated by means of the flotation gas from the water stream, accumulates as a supernatant body in the upper portion of each of the flotation and degassing zones. This oil is removed as subsequently described in greater detail through outlets 144, 146, 148 and 150 respectively. The oil, containing about 30% water, passes into outlet manifold 152 and flows into secondary oil-water separation zone 154 at a rate of 20 barrels per day.

The third individual flotation zone 40 is also equipped to treat the water stream with a secondary flotation gas by employing a secondary water recycle circuit, not shown, but precisely analogous to that described. A secondary flotation gas is dissolved in the secondary water recycle which passes through line 156 controlled by valve 158, block valve 160 being closed, and then passes through line 104 into distributor 140. The secondary flotation gas is collected separately at the upper potrion of flotation zone 40 and is separately removed therefrom through line 162 at a rate controlled by valve 164. This flotation gas may be recompressed and recycled in the exact manner described in connection with the primary flotation gas cycle.

The second flotation zone 38 is also provided for the introduction of optional water treating chemicals. These may be introduced through line 166 controlled by valve 168 and introduced through separate distributor 170. In case such optional chemicals are employed and a chemical-free oil product is desired, valve 190 in manifold 152 is closed and a substantial portion of the recovered oil may be removed free of chemicals through line 192 controlled by valve 194. For example, streams of aluminum sulfate and sodium silicate solutions may be introduced to form a floc in degassing zone 48 and which is removed therefrom through line 56. The floc-forming chemicals may be added to the raw water fed through lines 10 and/or 30 if desired.

The wet oil, removed from the top of the individual flotation and degassing zones, is passed through line 152 to settle and stratify in secondary oil-water separation zone 154. A supernatant body of relatively dry oil and a lower layer of oil-contaminated water are formed therein. The relatively dry oil is withdrawn through line 172 at a rate of 14 barrels per day controlled by valve 174 in accordance with liquid level controller 176. Any residual gases collecting therein are withdrawn through line 178 controlled by back pressure regulator 180. The oil-contaminated water separating in zone 154 is removed therefrom through line 182 and pumped by means of pump 184 at a rate of 6 barrels per day controlled by valve 186 through recycle line 28 for reintroduction and retreatment in multicell flotation zone 32 described above. The flow rate of this water recycle is controlled by means of differential liquid level controller 188.

In the present process the flotation unit is 12 feet long, 10 feet high and provided with 3 flotation cells 2 feet by 2 feet and a degassing zone 2 feet wide and 6 feet long. Only a primary flotation gas is employed, it is injected into the flotation zones at a total rate of 1200 S. C. F./D. and the water recycle rate is 600 barrels per day. The dry oil product rate is 14 barrels per day and the oil contains 3% residual water. The clean water product produced through line 60 flows at a rate of 2655 barrels per day and contains 3 p. p. m. of residual oil contamination. The contaminated water recycle from secondary separation zone 154 flows at a rate of 6 barrels per day. The remarkably low oil content of the product water stream is attributed to the elimination of internal circulation and turbulence of the water in the flotation zones, the linear flow of water, and the right angle flotation gas contacting.

*Example II*

As a comparison of the conventional means of separating oil and water mixtures, the following operation is one in which the same oil field brine and crude petroleum as described in Example I are separated in a wash tank. A total of 3000 barrels per day of a mixture of crude petroleum and water is produced from one part of the Playa del Rey field in Southern California. The crude petroleum has a water cut of 90%, that is, it contained 90% by volume of water. This material is passed through a gas trap from which 30 M. S. C. F./D. (M. S. C. F./D. is thousand standard cubic feet per day) of natural gas are removed and the oil and water then passed into a wash tank 15 feet in diameter and 24 feet high. A residence time of about 6 hours in the wash tank is provided. The oil is removed from the top of the tank at a rate of about 325 barrels per day and contains between about 10% and 12% water. The separated water is removed from the bottom of the tank at a rate of 2675 barrels per day and contains about 300 p. p. m. of emulsified oil and about 5000 p. p. m. of entrained free oil. The oil stream removed from the wash tank is passed into a plurality of stock tanks each 16 feet high and 20 feet in diameter where it is allowed to stand for prolonged periods and a separation of part of the water is effected. The oil product is removed at a rate of 295 barrels per day containing about 3% water. The contaminated water produced from the wash tank is treated in skim ponds exposed to the atmosphere for the recovery of free oil. However, the 300 p. p. m of emulsified oil would not settle out even on prolonged standing. This degree of oil contamination is greatly in excess of the maximum amount permitted by local sewage regulations for the disposal of waste water.

Referring now more particularly to Figure 2, the detailed side elevation view in cross section of the multizone flotation apparatus is shown. The general shape of the apparatus is that of a parallelepiped and shell 200 rests upon base 202. Inlet line 204 opens into distributing zone 206 to the left of distribution baffle 208. Baffle 208 is slotted and extends substantially from the bottom of the apparatus to a point adjacent, and preferably somewhat below, the desired liquid level. The purpose of this baffle is to distribute the incoming raw water uniformly over the transverse area open to liquid flow in the apparatus. In this modification the apparatus is shown with first flotation zone 210, second flotation zone 212, third flotation zone 214, fourth flotation zone 216, and degassing zone 218 which may be optionally a fifth flotation zone. A liquid removal zone 220 is provided adjacent the downstream end of the apparatus.

Separating these flotation and degassing zones are perforated baffles 222, 224, 226, and 228. Of the optional final baffle 230 provided, the only essential part is the top part of the baffle adjacent the liquid level which is employed for the skimming of residual quantities of oil from the liquid surface. These baffles serve to maintain a longitudinal flow of water through the apparatus in substantially straight lines and serve to redirect the water flowing therethrough into such straight flow lines minimizing any tendency toward internal circulation of the water within the individual flotation zones. These redirection and surface skimming baffles completely fill the cross-sectional area of the apparatus below the liquid level and are provided with fluid-tight seals at their edges against the walls and bottom of the apparatus.

All of the baffles, with the exception of baffle 208, are similar in construction and only a single baffle will be described, it being understood that the description applies as well to the other baffles.

Baffle 224 is representative of the baffles employed in this apparatus. The flat slotted portion extends from the bottom to a point adjacent the liquid surface. At this point curved cylindrical portion 232 is provided. Along the axis of this curved portion is located the driving rod 234 provided with a plurality of paddles 236. As shaft 234 is rotated in a counterclockwise direction, oil accumulating in the supernatant bodies 238 is picked up and deposited in the adjacent trough-like portion 240 from which it is removed, flowing by gravity or being pumped or by other convenient means. The physical construction of these baffles and troughs is more clearly shown in Figures 3–5 described below.

In third flotation zone 214 the upper portions of baffles 224 and 226 are extended from a point above the liquid level and sealed against the sides and top of shell 200. In this manner flotation zone 214 is sealed with respect to gas flow so that a secondary flotation gas may be employed as described above. This gas is removed separately through line 242 at a rate controlled by valve 224.

In each individual flotation cell flotation gas distributors 246, 248, 250, and 252 are provided. An optional distributor 254 is provided in degassing zone 218 to permit its use, if desired, as a flotation zone. Gas-saturated water recycle may be injected into distributor 254 through line 256 controlled by valve 258.

The primary flotation gas is removed from the individual zones within shell 200 through flotation gas manifold 260 which connects with the individual zones through individual conduits. In those cases in which secondary flotation gases are not employed, the upper portion 262 of baffles 224 and 226 need not be extended to the roof of shell 200 and the upper portion of the shell constitutes a manifold from which flotation gas may be withdrawn through a single outlet line.

From the lower end of removal zone 220 is provided outlet line 264 for the removal of treated water. As indicated in Figure 1, the rate at which water is removed through line 264 may be controlled by liquid level controller 266 to maintain a given liquid level within the apparatus. An optional outlet line 268 is provided and the rate at which liquid flows therethrough is controlled by the position of weir 270 which simultaneously controls the liquid level within the apparatus. As stated, either one or both of these outlet lines may be employed.

Referring now more particularly to Figure 3, an isometric view of the slotted baffles separating the individual flotation zones of this invention is shown. The baffle consists of three essential parts; a lower flat vertically slotted portion 272, an upper cylindrical portion 274, and a trough-like portion 276. The bottom and side edges of the baffle are sealed against the inside walls of the flotation apparatus shell. The slots are uniformly distributed through the cross-sectional area of slotted portion 272. The slots are preferably between about 0.25 inch and 0.75 inch wide. The total width of openings at any given height on the slotted portion of the baffle is preferably less than about 25% of the width of the baffle and preferably is between about 5% and about 15% of the baffle width. In Figure 3 is also shown axis 278 along which the paddle shaft 234 indicated in Figure 2 is placed. This is more clearly shown in Figure 5.

Referring now more particularly to Figure 4, a view of the baffle structure is shown taken in the direction indicated in Figure 3. The bottom of trough portion 276 is shown sloping downwardly toward the left and oil outlet 280 opens from the lower portion thereof through side wall 282 of the shell of the apparatus. Optionally an inlet 284 may be provided for the introduction of water or oil serving to flush out fluids and any foam collecting in trough 276.

In Figure 5, an elevation view of the edge of the baffle in Figure 3 is shown indicating flat portion 272, trough 276, and paddle shaft 278 provided with paddles 286. This view is taken in the direction indicated in Figure 3.

Referring now to Figure 6, an elevation view taken transversely through flotation zone 212 as indicated in Figure 2 indicates the placement of flotation gas distributor 248 and the optional chemical distributor 170 within the second flotation zone. Distributor 248 consists of a hollow tube 290 provided with a plurality of slots 292 along its upper surface. An orifice 294 is built in upstream from the slotted portion and across which a substantial pressure drop is maintained during water recycle flow thereby effecting the dissolution of dissolved flotation gas from the gas-saturated recycle water introduced through line 296. The orifice may be substituted with a valve if desired. The water and flotation gas bubbles discharge through slots 292 uniformly throughout the length of distributor 240.

Disposed immediately above distributor 290 is the chemical distributor 170 provided with an inlet 298 and a plurality of apertures 300 located along its outer surface. Water treating reagents, liquid or gaseous, may thus be distributed into the rising current of gas bubbles generated within distributor 290.

In the foregoing drawings, a finite number of individual flotation zones has been illustrated in Figures 1 and 2. These numbers are not intended to limit the number which may be employed in the present invention. Flotation systems having more than 2 and as high as 20 or 25 individual flotation cells may be fabricated according to this invention by employing the principles described above.

The physical dimensions of the flotation chamber are important in obtaining a clean water production and it is found preferable to employ an individual flotation zone having a regular cross-sectional shape, that is, either square or rectangular and providing a zone height which is between about 2 and about 10 times the zone width.

The quantity of flotation gas necessary varies as a function of the degree of oil contamination and also with the nature of the oil-water mixture. Generally, however, between 0.05 and 5.0 standard cubic feet per barrel is employed. Preferably between 0.1 and 1.0 standard cubic feet per barrel are used. Higher rates may be employed where the contamination is desirably reduced to a minimum for disposal. Maximum rates are used where economic conditions dictate a total recovery of oil contamination.

The clean water recycle rate varies somewhat with the solubility of the flotation gas therein and also with the pressure under which this gas is brought into contact with recycle water. Generally, the recycle rate is between 5 and 35 per cent of the raw water feed rate. Usually between 10 percent and 25 percent recycle gives best results.

The recycle water pressure is variable with the quantity of flotation gas which is desired to be dissolved in the recycle water for subsequent release in the flotation system. Generally, a pressure of between about 10 and 100 p. s. i. g. above the flotation system pressure is desirable.

The flotation gas injection pressure, e. g., the pressure under which a flotation gas is mixed with the recycle water, is preferably between about 15 and 110 p. s. i. g. above the flotation system pressure and between about 5 and 100 p. s. i. g. above the pressure of the water recycle. This pressure in turn determines, together with the recycle rate, the quantity of flotation gas available for release in the flotation system.

The flotation system pressure is preferably near atmospheric. However, this pressure may be maintained at subatmospheric or in super-atmospheric values as high as 1000 p. s. i. g. Preferably pressures between about atmospheric and 100 p. s. i. g. are employed.

The optimum residence time in the multicell flotation system varies with the nature of the oil contamination and with the number of cells. Generally, a residence time of from 1.0 to 60 minutes is adequate for nearly all oil-contaminated waters. In most instances residence times of between about 3 and 15 minutes are fully adequate to effect a substantially complete recovery of oil contamination.

It has been found that when the flotation gas is injected in partial solution in recycled clean water that the rates at which the flotation gas bubbles rise are between about 2 and 5 feet per minute for the average sized flotation gas bubbles and between about 0.3 and 1.0 feet per minute for the smallest bubble. These rates are applicable to oil field brines. When fresh water is treated, the rates of bubble rise are approximately twice those given above. Based on the rates given above, the size of the individual flotation zones may be estimated based upon the consideration that the horizontal lineal velocity of water through the multizone flotation system is preferably not greater than 10 feet per minute and more preferably is between about 1 and about 5 feet per minute. The flotation zones should be sufficiently long in the water flow direction so that substantially all of the average size bubbles, generated at the lower upstream corner of the flotation zone, reach and are disengaged at or before the upper downstream corner of the same flotation zone. Similar considerations apply in the designing of the size of the degassing zone. This zone should be sufficiently long in the flow direction so that the finest bubbles, generated in the next adjacent flotation zone upstream, will rise to the surface and be disengaged by the time the water reaches the downstream end of the degassing zone. Thus, if the water flows through the unit at 3.5 feet per minute and the average size bubbles rise at the rate of 3.5 feet per minute and the smallest bubbles rise at velocities between about 0.5 and 1.0 feet per minute in brine, the height and width of the flotation zones should be about 3.5 feet and the length of the degassing zone should be about 10 feet.

A particular embodiment of the present invention has been described hereinabove in considerable detail by way of illustration. It should be understood that various other modifications and adaptations thereof may be made by those skilled in this particular art without departing from the spirit and scope of this invention as set forth in the appended claims.

We claim:

1. A method for separating oil-contaminated streams of water to produce substantially oil-free water which comprises introducing an oil-contaminated stream of water into a primary separation zone wherein agglomerated oil rises rapidly to the surface, removing the oil thus accumulating, flowing the water therefrom into and horizontally in a substantially straight flow path through a plurality of individual laterally communicating flotation zones in succession, injecting a flotation gas-saturated stream of recycle water through a flow restriction into the bottom of at least one of said flotation zones whereby the recycle water is depressured and flotation gas is liberated from solution therein and passes upwardly substantially at right angles to the horizontal flow of water therethrough to separate oil contamination therefrom and carry said oil to the surface of said flow of water, flowing said water from the terminal flotation zone horizontally through an extended degassing zone to provide time for separation of residual flotation gas bubbles, removing substantially oil-free water from said degassing zone, contacting a first part of said water with said flotation gas under pressure to produce said gas-saturdated water for injection into said flotation zones, removing the remaining part of said water as process product, flowing separated oil from said flotation zones into a secondary separation zone for water-oil stratification, removing separated oil therefrom, removing separated oil-contaminated water therefrom, and recirculating said water for retreatment in said flotation zones.

2. A method according to claim 1 wherein said oil-contaminated water comprises oil field brine contaminated with crude oil and said flotation gas comprises natural gas.

3. A method for separating oil-contaminated streams of water to produce substantially oil-free water which comprises introducing an oil-contaminated stream of water into and horizontally in a substantially straight flow path through a plurality of individual laterally communicating flotation zones in succession, said individual flotation zones being separated from one another by substantially vertical foraminate baffles having a plurality of elongated apertures serving to maintain said stream of water in said horizontal linear path, injecting a flotation gas-saturated stream of recycle water under pressure through a flow restriction into the bottom of at least one of said flotation zones whereby the recycle water is depressured and flotation gas is liberated from solution therein and passes upwardly substantially at right angles to the horizontal flow of water therethrough to separate oil contamination therefrom and carry said oil to the surface of said flow of water, flowing said water from the terminal flotation zone horizontally through an extended degassing zone to provide time for separation of residual flotation gas bubbles, removing substantially oil-free water from said degassing zone, contacting a first part of said water with said flotation gas under pressure to produce said gas-saturated water for injection into said flotation zones, removing the remaining part of said water as process product, and withdrawing separated oil from the supernatant body thereof accumulating in said flotation zones.

4. A method according to claim 3 wherein the formation of insoluble metal sulfides in said stream of water is prevented through the removal of hydrogen sulfide therefrom by the stripping action of said flotation gas in combination with the step of injecting a bactericide into said flotation zone to inhibit the action of sulfate-reducing bacteria.

5. A method according to claim 3 wherein said first part of oil-free water is removed for recirculation from a point in said degassing zone adjacent the upper downstream portion thereof and contains residual unseparated flotation gas bubbles.

6. A method according to claim 3 wherein said first part of oil-free water is removed from a point in said degassing zone adjacent the upper upstream portion thereof and contains residual unseparated flotation gas bubbles for recirculation whereby a proportionately reduced lineal velocity of water flow is maintained in said degassing zone.

7. A method according to claim 3 in combination with the steps of passing a primary flotation gas through at least one of said flotation zones, passing a secondary flotation gas through at least one other of said flotation zones, and maintaining separate independent recycle streams of said primary and secondary flotation gases through said flotation zones by means of separate independent gas-saturated recycle water streams.

8. A method according to claim 7 wherein one of said primary and secondary flotation gas streams comprises a gas containing carbon dioxide to displace the calcium carbonate equilibrium toward the bicarbonate to inhibit calcium carbonate precipitation in said water.

9. A method according to claim 3 in combination with the step of maintaining the lineal velocity of water flowing horizontally through said flotation zones at a value whereby substantially all of the macroscopic flotation gas bubbles generated at the lower portion thereof rise to the surface and are disengaged from the liquid in the same flotation zone.

10. A method according to claim 3 in combination with the step of flowing said water through said degassing zone for a sufficient time to disengage at least the major portion of the microscopic flotation gas bubbles generated in said terminal flotation.

11. A method for separating oil from oil-contaminated water which comprises passing a stream of oil-contaminated water successively through a plurality of flotation zones, said plurality of flotation zones being separated from one another by substantially vertical foraminate baffles having a plurality of elongated apertures thereby maintaining said stream flowing in a substantially horizontal linear path through the successive flotation zones, contacting said stream of water therein with a stream of flotation gas bubbles passing therethrough substantially at right angles to the flow direction of said stream to produce a substantially oil-free stream of water leaving the last flotation zone and supernatant accumulations of separated oil in each of said zones, disengaging flotation gas at the top of said zones, removing oil from said supernatant accumulations thereof, separating a portion of the oil-free water leaving the last flotation zone, contacting said portion with flotation gas at an elevated pressure whereby at least part of said gas is dissolved therein to form a gas-saturated water recycle, injecting and depressuring said gas-saturated water recycle through a flow restriction into said flotation zones thereby releasing flotation gas bubbles by dissolution, and removing the remaining portion of the oil-free water as a product of the process.

12. A method according to claim 11 in combination with the steps of repressuring flotation gas disengaged from said flotation zones, and contacting the repressured gas with a portion of said oil-free water to produce said gas-saturated water recycle.

13. A method for purification of oil-contaminated water which comprises passing a stream of oil-contaminated water horizontally in a straight line path through a plurality of individual communicating flotation zones, said individual flotation zones being separated from one another by substantially vertical foraminate baffles having a plurality of elongated apertures serving to maintain said stream flowing successively through said zones in the horizontal linear path, injecting gas-saturated water under pressure through a flow restriction into the lower part of at least two of said flotation zones whereby said water is depressured and flotation gas is liberated from solution in said saturated water and passes upwardly substantially at right angles to the flow of water in said flotation zones to separate oil contamination therefrom and carry said oil to the surface of said flow of water, removing separated oil from the surface of water in each of said flotation zones, removing flotation gas from the upper part of said flotation zone, and withdrawing a stream of substantially oil-free water from the last of said flotation zones.

14. An apparatus for the separation of oil-contaminated water which comprises a primary separation chamber, an inlet for raw oily water thereto, an outlet from the upper part thereof for separated oil, an elongated closed flotation chamber, a plurality of substantially vertical, foraminate, parallel spaced baffles disposed therein to divide said chamber into a plurality of individual laterally communicating flotation cells and a terminal degassing cell and adapted to the horizontal substantially linear flow of water alternately through the openings in said baffles and said cells in succession, a conduit for oil-contaminated water communicating said primary separation chamber with the upstream inlet end of said flotation chamber, an outlet conduit for water from the downstream outlet end of said degassing cell, means for contacting part of the water removed from said degassing cell with a flotation gas under elevated pressure to produce a gas-saturated water recycle, means for injecting and depressuring said water recycle into the lower upstream part of at least one of said flotation cells, an outlet conduit for removal of flotation gas from the top of said flotation chamber, means for removing separated oil from the supernatant layer therein, a secondary separation chamber, a conduit for separated oil communicating said last-named means with said secondary separation chamber, an outlet for partially dried oil from the upper portion thereof, and conduit means for recycle oil-contaminated water communicating the lower part of said secondary separation chamber with said upstream inlet end of said flotation chamber.

15. An apparatus for the separation of oil-contaminated water which comprises an elongated closed flotation chamber, a plurality of substantially vertical, foraminate, parallel spaced baffles disposed therein to divide said chamber into a plurality of individual laterally communicating flotation cells and a terminal degassing cell and adapted to the horizontal substantially linear flow of water alternately through the openings in said baffles and said cells in succession, a conduit for oil-contaminated water opening into the upstream inlet end of said flotation chamber, an outlet conduit for water from the downstream outlet end of said degassing cell, means for contacting part of the water removed from said degassing cell with a flotation gas under elevated pressure to produce a gas-saturated water recycle, means for injecting and depressuring said water recycle into the lower upstream part of at least one of said flotation cells, an outlet conduit for removal of flotation gas from the top of said flotation chamber, and means for removing separated oil from the supernatant layer therein.

16. An apparatus according to claim 15 wherein said foraminate parallel spaced baffles are sealed at their edges against the bottom and sides of said flotation chamber, said baffles comprising a lower extended flat portion provided with a plurality of slotted openings geometrically distributed throughout said flat portion, a curved cylindrical portion registering at one of its edges with the upper edge of said flat portion, and a trough-shaped portion registering with the other edge of said curved portion.

17. An apparatus according to claim 16 in combination with a rotatable shaft disposed along the axis of said curved cylindrical portion, at least two longitudinal paddles extending radially therefrom to an edge adjacent said curved portion, and means for rotating said shaft whereby said paddle edges move adjacent said curved portion from the edge thereof registering with said flat portion toward the edge registering with said trough-shaped portion whereby oil accumulating adjacent the curved portion is picked up and deposited in said trough.

18. An apparatus according to claim 17 wherein said flat portion is provided with a plurality of elongated slot-like openings having widths of between 0.25 and 0.75 inches, the total open width across said portion at any given height being less than about 25% of the width of said portion.

19. An apparatus according to claim 18 wherein said flotation chamber has the general shape of a parallelepiped.

References Cited in the file of this patent

UNITED STATES PATENTS

| Number | Name | Date |
|---|---|---|
| 507,774 | Ball | Oct. 31, 1893 |
| 864,856 | Norris | Sept. 8, 1907 |
| 1,235,083 | Wagner | July 31, 1917 |
| 1,672,583 | Travers | June 5, 1928 |
| 1,703,041 | Imhoff | Feb. 19, 1929 |
| 1,717,223 | Karlstrom | June 11, 1929 |
| 1,947,709 | Garrison et al. | Feb. 20, 1934 |
| 2,047,989 | Woelflin | July 21, 1936 |
| 2,220,574 | Little et al. | Nov. 5, 1940 |
| 2,288,333 | Vinson | June 30, 1942 |
| 2,446,655 | Lawrason | Aug. 10, 1948 |